United States Patent Office 2,992,095
Patented July 11, 1961

2,992,095
PROCESS OF SEPARATING NIOBIUM AND TANTALUM VALUES IN OXIDIC ORES AND OF PRODUCING PURE NIOBIUM
John Choi Li, Glen Cove, N.Y., assignor to Wah Chang Corporation, New York, N.Y., a corporation of New York
No Drawing. Filed Jan. 17, 1958, Ser. No. 709,468
6 Claims. (Cl. 75—27)

The metal niobium as it occurs in nature is usually associated with tantalum in oxidic ores such as columbite, tantalite, samarskite and fergusonite. In such ores the pentoxides of niobium and tantalum are associated with varying amounts of other metallic oxides such as those of iron, manganese, and titanium. The similar chemical characteristics of niobium and tantalum present unusual difficulties to a positive, commercial separation of these metals. Despite the fact that metallic niobium in a relatively pure state is of increasing commercial value, there does not appear to be available any practical method by which it may be readily separated from tantalum. While various processes of varying technical excellence have been proposed, such processes appear to be costly and cumbersome when viewed from the standpoint of large scale commercial production. Many such processes involve the conversion of the oxides to salts and the subsequent separation of the salts by reduction or other processing. Other processes involve the use of electrolytic processing of specially formed salts.

The present invention has as a principal object the provision of methods by which the naturally occurring oxides of niobium and tantalum are directly and positively separated by a reduction process involving only a single thermal step in which the majority of the niobium values are directly separated from most of the tantalum values. In addition the invention has the further object of producing from niobium oxide, when desired, in a next, and additional, step a pure metallic niobium.

The processes contemplated by this invention involve a step, in which a raw, or concentrated, relatively impure source containing niobium and tantalum values in the form of oxides is subjected to a thermite-type of reaction to effect a substantial separation of the niobium and tantalum values as a result of which much of the niobium values appear in the metal regulus which results from the reaction and most of the tantalum values appear in the slag which is likewise a result from the reaction. Thereafter the metal regulus may be treated by known chemical methods to obtain a niobium oxide. If the niobium oxide thus obtained is sufficiently free of tantalum for the purposes required it may then be reduced to niobium metal in any known way. If, however, it is desired to further purify the niobium oxide of residual tantalum values this invention provides a second step of processing which essentially consists in subjecting the niobium oxide to a thermite type reaction in the presence of copper obtaining as a final product a copper niobium regulus from which the copper may be dissolved or otherwise removed leaving a very pure niobium metal. Even if the niobium oxide is sufficiently free of tantalum the second step or process just mentioned may be advantageously used for efficient production of a pure niobium metal from niobium oxide.

In accordance with this invention the initial processing may be performed in two different ways, both of which presently appear to be so equally efficient that the choice between them will be governed primarily by considerations of cost and availability of materials and the convenience of a particular operation. For convenience of discussion I designate these processes as alternate "A" and alternate "B."

In the alternate "A" process the material containing the niobium and tantalum oxide values is subjected to the action of a reducing metal in the presence of copper, preferably copper oxide. In the alternate "B" process the material containing the niobium and tantalum values is subjected to the action of a reducing agent in the presence of a titanium oxide having a greater oxygen content than titanium monoxide (TiO) such as titanium dioxide ($TiO_2$) or titanium trioxide ($Ti_2O_3$) or an equivalent such as the ferro-titanium oxide ($FeTiO_3$) of the mineral ilmenite.

Regardless of whether alternate process "A" or "B" is used the starting material may either be a raw ore of the type above described containing niobium and tantalum oxides or a concentrate obtained by subjecting any ore or source containing niobium and tantalum oxide to standard processes of concentration such as magnetic separation, electric-static separation or digestion with mineral acids. Whether the starting material is concentrated is an economic matter. In any event the oxide containing starting material is placed in a pulverized or equivalent form so that in the process of this invention it may be conveniently and relatively uniformly mixed with the other reactants.

In the alternate process "A" of this invention the oxidic starting material is mixed with copper oxide, or copper, and a reducing material which may be magnesium, aluminum, misch metal or the like but is preferably aluminum. This reducing material should be powdered or in the form of discrete and relatively small particles. The amount of reducing material used should preferably not exceed that required to reduce the niobium oxide, the copper oxides and the iron oxides which may be present in the starting charge. Preferably the amount of reducing material is somewhat less than theoretically required for this purpose. In any event an excess of metallic reducing material over that necessary to reduce the niobium, the copper and the iron oxides present in the starting charge is to be avoided if the ultimate object is the production of niobium values of highest possible purity. The amount of copper or copper oxide which is to be used in the practice of this invention depends essentially on the niobium and iron content of the charge, since, as will later appear, the metallic copper produced during the reduction operates as a mechanical collector of niobium and iron values and the efficiency of the process is best realized when there is a sufficient amount of copper present to insure the collection of the reduced niobium metal. Since alloying of the copper with the niobium and iron does not take place to any appreciable extent the copper acts as a mechanical collector and by mere observation the amount most suitable for a given operation can be ascertained. Generally speaking, good results will be obtained if the copper present is at least 10% by weight of the total weight of the niobium and iron oxides in the starting material. It may be desirable, and, indeed, it is often convenient, to use larger amounts of copper oxide particularly where it is desired that the reaction between the oxidic content of the charge and the reducing metal will be sufficient to produce the necessary total heat which will cause the desired melting of the metallics obtained by the reduction and the flow of the metal regulus which is formed by those metallics. However, the use of larger amounts of copper oxide in order to produce the over-all heat required is not necessary since such heat may be produced by adding iron oxide to the charge or by supplying external heat during the reduction reaction. Once the charge has been formed, in accordance with the principles just mentioned, the thermite type reaction between the reducing material and the oxides is initiated in any usual manner such as, for instance, by the use of a small amount of aluminum powder and sodium peroxide as an igniter. As the reaction proceeds much of the niobium oxides, iron oxides and copper oxides present are reduced and the produced niobium and iron form a ferroniobium which is collected by the copper, these metals forming a regulus or button which is readily separated from the slag. This regulus may also contain small amounts of manganese, tin and tungsten, if such metals were present in the starting material, and will also contain an amount of tantalum which represents but a small percentage of the original tantalum content of the ore. However, most of the tantalum values pass into the slag which usually contains over 95% of the tantalum values of the starting material. The slag will also usually contain not more than 50% and often as little as 30% of the niobium values of the starting material. This slag may be rejected or may be further treated either as a source of tantalum or as a source of niobium as economic circumstances may dictate. The metal regulus, which often contains as much as 70% by weight of the niobium values of the ore, contaminated with only a small percentage of the tantalum values, may be then treated chemically in the manner hereinafter set forth, or in any other known way, to remove the iron, copper, tin, tungsten and managanese as may be present to obtain a relatively pure niobium oxide.

Turning now to the alternate process B, a starting material containing niobium and tantalum values, in oxidic form as above indicated, is provided with a content of titanium oxide, having a greater oxygen content than titanium monoxide, in such amount that the available titanium oxide in the charge is at least about 10% of the weight of the niobium oxide content of the charge. Lesser amounts of said titanium oxide in the charge are inefficient. Greater amounts may be used if desired but apparently do no more than increase the amount of materials treated without a substantially rewarding increase in efficiency. The starting material with such a titanium oxide content is mixed with reducing metal of the type above mentioned in an amount which preferably should not exceed that required to reduce the niobium oxide and such iron oxides as may be present in the charge. If the amount of iron oxide in the ore under treatment is not sufficient, when taken with the niobium oxide, to produce the desired heat of reaction additional iron oxide may be added to the charge or, alternatively, external heat may be applied. The charge having been formed a thermite type reaction between the reducing metal and the niobium oxides and iron oxides is initiated, in any usual way, with the result that much of the niobium and iron are reduced from their respective oxides and form a ferroniobium which sinks to the bottom of the charge and is readily separated from the slag. This regulus may also contain manganese, tin and tungsten impurities, if such were present in the ore or starting material, and will also contain a small portion of the original tantalum values in the ore. Most of the tantalum values in the starting material will go into the slag as will the titanium values which were added to the charge. It is my present understanding of this alternate process "B" that the titanium oxide material in the starting charge inhibits, in some way, the concurrent reduction of niobium and tantalum oxides thereby effecting the separation of most of the tantalum values of the starting material in the slag rather than in the metallic regulus produced. In relative efficiency of separation from tantalum and niobium values this alternate process "B" is substantially equal to the efficiency above stated of the alternate process "A" in which copper is used as a collector.

It will be observed that when copper is employed as a collector the regulus obtained from the thermite-type reaction consists principally of copper, iron and niobium values in mteallic form. It will further be observed that when the alternate process "B" is used, in which titanium oxide is employed and no copper is used, the regulus principally contains iron and niobium.

Regardless of which of these alternate processes is used the resulting metal regulus may be treated chemically by methods which involve the selective dissolving of either the niobium values, or the iron, or the iron and copper values, according to usual chemical principles. Since the metal regulus from either process contains amounts of iron, and possibly other metals such as manganese, which form alloys with niobium a satisfactory separation of niobium values from these metals cannot ordinarily be effected by the use of mineral acids. Therefore it is preferable to digest the metal regulus, formed as a result of either of the alternate processes above described, in an alkali to effect the separation of the other metals from the niobium values. For instance when the alkali used is potassium hydroxide, potassium niobium solution is obtained which may readily be separated from precipitated iron, manganese and copper values. If desired, the potassium niobium solution may then be added to a solution containing an excess of sodium hydroxide thereby forming sodium niobate

$$7Na_2O.6Nb_2O_5.31H_2O$$

and eliminating a large part of any tin and tungsten impurities. The sodium niobate salt thus obtained may then be formed into a slurry and treated with hydrochloride acid, or otherwise suitably acidified, to produce niobic acid as a precipitate which acid may then be calcined to obtain niobic oxide.

Regardless of how the niobium values may be recovered from the metal regulus the product is a niobium, or niobium oxide, which contains, in relation to the original starting material, but a small amount of tantalum. Quite often this product will be pure enough for the purpose desired but where it is desired to obtain a pure niobium metal this invention contemplates, as a second step, the retreatment of the niobium values as will now be described.

In this phase of my invention, which may be practiced whether or not the previously described alternative processes A and B are used, niobium oxide is mixed with copper values, either copper oxide or copper, in an amount which for good results should at least equal about 12% by weight of copper of the total weight of niobium oxide which is to be charged. Lesser amounts can be used but since the copper eventually acts as the collector of the niobium metal too small amounts thereof interfere with the efficiency of the process. Larger amounts of copper may also be used but these are inherently wasteful unless the additional copper is added in the form of copper oxide for the purpose of furnishing sufficient reaction material, with the reducing metal which is to be added to the charge to produce the desired heat. Thus if the niobium oxide and copper oxide content taken in total is not sufficient, upon reaction with the reducing metal, to produce the desired heat then in this phase of my process either external heat may be applied or more conveniently the copper oxide content may be raised. It is also possible, but usually not commercially feasible, to use other oxide reactants the metal portion of which would be volatilized at the temperature of the reaction and thus not tend to contaminate the metal regulus eventually obtained. To the oxidic metals of the charge are added an amount of reducing metal which is not greater than the theoretical amount necessary to reduce the oxides of the charge, and is preferably less than that theoretical amount in order to avoid any possibility that the metal regulus finally obtained will contain any substantial amount of the reducing metal. The charge, having been formed, is ignited in any suitable manner to start the thermite-type reaction, the result being that the niobium oxide and copper oxide present is largely reduced and a metal regulus is formed consisting essentially of a mixture of copper and niobuim. Such tantalum oxide as may be present in the niobium oxide largely passes, during this reaction, into a slag which is readily physically separated from the metal regulus. The metal regulus thus formed is pulverized and leached with any convenient acid to remove copper. After the leaching the residue is heated to an elevated temperature to vaporize residual copper and other volatile impurities. As a result there remains a niobium powder which is usually better than 99% pure and which may be of a purity as high as 99.5%.

In the above description of my alternate process "A" where copper is used as a collector and of the later step of my process where copper is also used as a collector it has been generally indicated that the copper values in the original charge may be present either as copper or a copper oxide. Thus copper and its oxide may be considered as a class from which may be selected the source of the copper values. Copper oxide is much preferred in the starting charge not only because of its relative expense as compared with metallic copper but also because during the thermite-type reactions involved some oxidation and deoxidation of the copper will take place thereby interfering to some extent with the efficiency of the process. However, metallic copper may be used as the sole, or partial, source of copper values in the starting charge.

Illustrative of the simplicity of the process of this invention and efficiency and the positiveness of separation achieved between the niobium and tantalum values and of the extremely high purity niobium which may, if desired, be obtained are the following Examples 1, 2 and 4. Example 3 is set forth to illustrate results obtained when the practices of this invention are not employed.

*Example 1.*—A columbate type of ore containing 1.63 percent by weight of $Ta_2O_5$, 49.41 percent by weight of $Nb_2O_5$, and 12.38 percent by weight of iron oxide was pulverized and used as a starting material in an amount of 9.99 kilograms. This starting material was thoroughly mixed with 1.93 kilograms of copper oxide and 2.27 kilograms of aluminum powder. The charge was placed in a clay crucible and the thermite reaction started by ignition with a mixture of aluminum powder and sodium peroxide. The metal regulus formed as the result of the reaction weighed 3.19 kilograms and this was separated from the remainder of the reactants most of which remainder was in the form of a slag. Upon analysis of the metal regulus it was found that the regulus contained 53.10 percent by weight of the total niobium content of the charge and only 1.81 percent by weight of the total tantalum content of the charge.

*Example 2.*—A columbate type of ore containing 6.31 percent by weight of $Ta_2O_5$, 69.79 percent by weight of $Nb_2O_5$, and 21.37 percent by weight of iron oxide was mixed with an amount of the mineral ilmenite to furnish to the mixture a titanium dioxide content of 10 percent by weight. 54.5 kilograms of this mixture was then mixed with 12.26 kilograms of aluminum powder and the final mixture placed in a crucible. The thermite reaction was started by ignition with a mixture of aluminum powder and sodium peroxide. After the reaction was spent the metal regulus formed was separated from the slag and found to weigh 21.34 kilograms. Analysis revealed that the regulus contained 49.99 percent by weight of the total niobium content of the charge and but 1.74 percent by weight of the total tantalum content of the charge.

*Example 3.*—45.4 kilograms of a columbate type ore containing 6.31 percent by weight of $Ta_2O_5$, 69.79 percent by weight of $Nb_2O_5$ and 23.02 percent by weight of iron oxide was pulverized and mixed with 11.34 kilograms of aluminum powder. No copper oxide was added (compare with Example 1) and no titanium oxide was added (compare with Example 2). The charge thus formed was placed in a clay crucible and the thermite reaction ignited with a mixture of aluminum powder and sodium peroxide. After the reaction was spent the resulting metal regulus, which weighed 20.43 kilograms, was separated from the slag and analyzed. The regulus contained 13.27 percent of the tantalum present in the original charge and 43.50 percent of the niobium present in the original charge.

*Example 4.*—A niobium oxide containing, by weight, 69.41 percent of niobium, 0.05 percent of tantalum, 0.02 percent of iron, 0.03 percent of titanium and a trace of copper was selected and 3.65 kilograms of this oxide were mixed with 0.55 kilogram of copper oxide and 1.17 kilograms of aluminum powder. The reaction mixture thus formed was placed in a crucible and ignited. When the reaction was spent the metal regulus obtained as a result of the reaction, which has a weight of 2.96 kilograms, was separated from the slag which had a weight of 1.94 kilograms. The metal regulus was leached with a 20 percent aqueous solution of nitric acid, washed with water and the residual nobium powder was then dried in a vacuum at 110° centigrade. The analysis of the regulus, of the slag and of the final niobium powder show the following:

|  | Percent by Weight | | | | |
| --- | --- | --- | --- | --- | --- |
|  | Ta | Nb | Fe | Ti | Cu |
| Regulus | 0.02 | 83.19 | 0.03 | 0.01 | 13.96 |
| Slag | 0.07 | 3.19 |  | 0.05 | 0.35 |
| Final Niobium Powder | 0.05 | 99.53 | 0.04 | 0.02 | 0.06 |

In addition the final niobium powder had an aluminum content of 0.20 percent.

I claim:

1. In a method of separating niobium values from tantalum values in a material containing the oxides of niobium, tantalum and iron by a thermite type reaction in which the said oxide containing material is mixed with a reducing metal to form a reaction mixture and the reducing reaction is started by the application of heat, the improvement consisting of furnishing in the said reaction mixture copper values, selected from the class consisting of copper and copper oxides, in an amount sufficient to produce during the reaction a mass of molten copper in which will physically collect the niobium and iron produced by said reduction and limiting the reducing metal content of the reaction mixture to an amount not substantially exceeding that theoretically required to reduce the niobium iron and copper oxide content of the mixture from oxide to metal, whereby the resultant niobium as so collected is substantially free of said reducing metal except as an impurity.

2. The process of claim 1 in which the copper values in the reaction mixture calculated as copper are not less than about 10 percent of the weight of the niobium and iron oxides in said mixture.

3. In a method of separating niobium values from tantalum values in a material containing the oxides of niobium, tantalum and iron by a thermite type reaction in which said oxide containing material is mixed with a reducing metal to form a reaction mixture and the reducing action is started by the application of heat, the improvement consisting of providing the reaction mixture with titanium oxide having a greater oxygen content than that of titanium monoxide in an amount at least equal to about 10 percent of the weight of the niobium oxide content of the reaction mixture and limiting the reducing metal content of the reaction mixture to an amount not substantially exceeding that theoretically required to reduce the niobium oxide and iron oxide content of the mixture from oxide to metal.

4. In a method of obtaining a relatively pure niobium from niobic oxide by a thermite type reaction in which the niobic oxide is mixed with reducing metal to form a reaction mixture and the reducing action is started by the application of heat, the improvement consisting of furnishing in the said reaction mixture copper values selected from the class consisting of copper and copper oxides in an amount sufficient to produce during the reaction a mass of molten copper in which will physically collect the niobium produced by said reduction and limiting the reducing metal content of the reaction mixture to an amount not substantially exceeding that theoretically required to reduce the niobium oxide and copper oxide content of the mixture from oxide to metal, whereby the resultant niobium as so collected is substantially free of said reducing metal except as an impurity.

5. The process of claim 4 in which the copper values in the reaction mixture calculated as copper are not less than about 12 percent of the weight of the niobium oxide content of said mixture.

6. The method of preparing a metal selected from the group consisting of tantalum and columbium which comprises forming a reduction mixture consisting essentially of the pentoxide of the selected metal and a copper oxide together with an amount of aluminum sufficient but not substantially more than that theoretically required to reduce the oxides to metal, igniting said reduction mixture and thereby causing the reduction of said oxides to proceed to completion and form a molten burden consisting essentially of molten alumina slag and a metal product consisting essentially of solid particles of the selected metal dispersed in molten copper, permitting the molten burden to solidify and separating the metal product from the alumina slag, and recovering the particles of the selected metal from the separated metal product.

References Cited in the file of this patent

UNITED STATES PATENTS

| | | |
|---|---|---|
| 1,321,684 | Turner | Nov. 11, 1919 |
| 1,742,417 | Schrobsdorff | Jan. 7, 1930 |
| 2,004,498 | Becket | June 11, 1935 |
| 2,183,517 | Leemans | Dec. 12, 1939 |
| 2,203,214 | Doom | June 4, 1940 |
| 2,789,896 | Coffer | Apr. 23, 1957 |
| 2,905,548 | Taylor et al. | Sept. 22, 1959 |
| 2,905,549 | Taylor et al. | Sept. 22, 1959 |

FOREIGN PATENTS

| | | |
|---|---|---|
| 541,515 | Canada | May 28, 1957 |
| 541,518 | Canada | May 28, 1957 |